(12) United States Patent
Kamimura et al.

(10) Patent No.: US 12,371,882 B2
(45) Date of Patent: Jul. 29, 2025

(54) OPERATION INSTRUCTION SYSTEM

(71) Applicant: KOBELCO CONSTRUCTION MACHINERY CO., LTD., Hiroshima (JP)

(72) Inventors: Yusuke Kamimura, Hiroshima (JP); Daisuke Noda, Hiroshima (JP); Yoichiro Yamazaki, Hiroshima (JP)

(73) Assignee: KOBELCO CONSTRUCTION MACHINERY CO., LTD., Hiroshima (JP)

( * ) Notice: Subject to any disclaimer, the term of this patent is extended or adjusted under 35 U.S.C. 154(b) by 266 days.

(21) Appl. No.: 17/642,428

(22) PCT Filed: Jul. 28, 2020

(86) PCT No.: PCT/JP2020/028933
§ 371 (c)(1),
(2) Date: Mar. 11, 2022

(87) PCT Pub. No.: WO2021/059730
PCT Pub. Date: Apr. 1, 2021

(65) Prior Publication Data
US 2022/0341131 A1  Oct. 27, 2022

(30) Foreign Application Priority Data
Sep. 26, 2019  (JP) ................ 2019-175272

(51) Int. Cl.
*E02F 9/20* (2006.01)
*E02F 9/26* (2006.01)
*G05D 1/20* (2024.01)

(52) U.S. Cl.
CPC ............ *E02F 9/265* (2013.01); *E02F 9/205* (2013.01); *E02F 9/261* (2013.01); *G05D 1/20* (2024.01)

(58) Field of Classification Search
CPC . E02F 3/438; E02F 9/205; E02F 3/437; E02F 9/265; E02F 9/2041; E02F 3/439; E02F 3/43
See application file for complete search history.

(56) References Cited

U.S. PATENT DOCUMENTS 5,116,186 A * 5/1992 Hanamoto ............ E02F 3/437
                                                  37/348
5,224,033 A * 6/1993 Nakamura ............ E02F 9/221
                                                  702/56
(Continued)

FOREIGN PATENT DOCUMENTS

CN    106661867 A    5/2017
CN    108138459 A    6/2018
(Continued)

OTHER PUBLICATIONS

Mitsuhiro Kamezaki, Hiroyasu Iwata, and Shigeki Sugano, Development of Operator Support System with Primitive Static States for Intelligent Construction Machinery, Apr. 200, IEEE International Conference on Mechatronics, pp. 1-6 (Year: 2009).*

(Continued)

*Primary Examiner* — Khoi H Tran
*Assistant Examiner* — Dairon Estevez
(74) *Attorney, Agent, or Firm* — Oblon, McClelland, Maier & Neustadt, L.L.P.

(57) ABSTRACT

A point generating unit of a mobile terminal generates teaching point information associating a teaching position that teaches the work machine a position of the attachment in a series of movements to be performed by the work machine with orientation information indicating a target orientation at the teaching position, based on a slewing angle of an upper slewing body and on orientation information on the attachment. A point changing unit changes the generated teaching point information. When the teaching point infor- (Continued)

mation is changed, an instruction generating unit of the work machine generates an automatic operation instruction for automatically operating a slewing device and the attachment, based on the changed teaching point information. An operation control unit of the work machine automatically operates the slewing device and the attachment, based on the automatic operation instruction.

4 Claims, 17 Drawing Sheets

(56) References Cited

U.S. PATENT DOCUMENTS

| | | | |
|---|---|---|---|
| 6,169,948 B1 | 1/2001 | Fujishima et al. | |
| 6,195,610 B1 | 2/2001 | Kaneko | |
| 2010/0131122 A1* | 5/2010 | Dersjo | E02F 9/2253 701/2 |
| 2013/0167227 A1 | 6/2013 | Miura et al. | |
| 2015/0373545 A1 | 12/2015 | Miura et al. | |
| 2016/0244950 A1* | 8/2016 | Kami | E02F 9/265 |
| 2018/0223504 A1 | 8/2018 | Gonzalez et al. | |
| 2018/0305902 A1 | 10/2018 | Tsukamoto | |
| 2019/0218749 A1* | 7/2019 | Hiromatsu | E02F 9/26 |
| 2019/0345690 A1* | 11/2019 | Graham | G05G 9/04737 |
| 2020/0240116 A1 | 7/2020 | Cheng et al. | |
| 2020/0385957 A1* | 12/2020 | Tanaka | G01C 3/08 |
| 2020/0399865 A1 | 12/2020 | Tsukamoto | |
| 2021/0002851 A1* | 1/2021 | Morita | E02F 3/439 |
| 2021/0254304 A1* | 8/2021 | Konda | E02F 9/262 |
| 2021/0312721 A1* | 10/2021 | Hamada | E02F 9/205 |

FOREIGN PATENT DOCUMENTS

| | | |
|---|---|---|
| EP | 0 990 739 A1 | 4/2000 |
| JP | 9-198133 A | 7/1997 |
| JP | 10-8490 A | 1/1998 |
| JP | 10-183671 A | 7/1998 |
| JP | 11286968 A * | 10/1999 |
| JP | 11-324027 A | 11/1999 |
| JP | 2001-182091 A | 7/2001 |
| JP | 2013-23982 A | 2/2013 |
| JP | 2019-108775 A | 7/2019 |
| JP | 2020-118018 A | 8/2020 |
| WO | WO 2017/115809 A1 | 7/2017 |

OTHER PUBLICATIONS

International Search Report issued Sep. 15, 2020 in PCT/JP2020/028933 filed on Jul. 28, 2020, 3 pages.
Extended European Search Report issued Sep. 12, 2022 in European Patent Application No. 20869867.0, 8 pages.

* cited by examiner

FIG.17

|  | BOOM | | ARM | | BUCKET | | SLEWING |
|---|---|---|---|---|---|---|---|
|  | RAISING | LOWERING | PULLING | PUSHING | EXCAVATION | SOIL DISCHARGE | |
| EXCAVATION | ○ |  | ○ |  | ○ |  |  |
| LIFTING/ SLEWING | ○ |  |  |  |  |  | ○ |
| SOIL DISCHARGE |  |  |  |  |  | ○ |  |
| RETURNING/ SLEWING |  | ○ |  |  |  |  | ○ |

OPERATION INSTRUCTION SYSTEM

TECHNICAL FIELD

The present invention relates to a technique for teaching operations to a work machine.

BACKGROUND ART

For example, Patent Literature 1 discloses an automatic operation excavator that causes an excavator to automatically carry out a series of repetitive movements, based on an excavation position and a soil discharge position that have been taught in advance.

Further, for example, Patent Literature 2 discloses direct teach according to which when a direct setting switch is pressed after a front end point of a bucket is moved to a target position, an area in which a front device is movable is set. Patent Literature 2 discloses also a technique by which a numerical value set by the direct teach is used as a reference value, and the numerical value is changed by a numerical value input switch.

There is a case where the position or shape of a work subject is different from the position or shape of the same taught in advance. When a degree of difference between the two is large, reteaching is necessary, and operating a work machine for the purpose of reteaching reduces work efficiency. When the degree of difference between the two is small, this case may be handled by such a numerical value changing technique as described in Patent Literature 2. Nevertheless, this approach requires an operator who operates the work machine to make input every time reteaching is needed, which too reduces the work efficiency.

CITATION LIST

Patent Literature

Patent Literature 1: JP 2001-182091 A
Patent Literature 2: JP H10-8490 A

SUMMARY OF INVENTION

An object of the present invention is to provide a technique by which work efficiency can be improved.

An operation instruction system according to an aspect of the present invention includes: a work machine; a mobile terminal capable of communicating with the work machine; an information generating unit that generates orientation information on the work machine; and an instruction generating unit that generates an instruction for operating the work machine, in which the work machine includes: a lower travelling body; an upper slewing body attached rotatably to top of the lower travelling body; a slewing device capable of causing the upper slewing body to slew; an attachment attached rotatably to the upper slewing body; a slewing angle detection device that detects a slewing angle of the upper stewing body relative to the lower travelling body; an orientation detection device that detects an orientation of the attachment; and an operation control unit that operates the slewing device and the attachment, based on the instruction generated by the instruction generating unit, the information generating unit generates the orientation information, based on a slewing angle of the upper slewing body, the slewing angle being detected by the slewing angle detection device, and on an orientation of the attachment, the orientation being detected by the orientation detection device, the mobile terminal includes: a point generating unit that generates, based on the orientation information generated by the information generating unit, teaching point information associating a teaching position that teaches a position of the attachment in a series of movements to be performed by the work machine with the orientation information indicating a target orientation at the teaching position; and a point changing unit that changes the teaching point information generated by the point generating unit, the instruction generating unit generates an automatic operation instruction for automatically operating the slewing device and the attachment, based on the teaching point information generated the by the point generating unit, and when the teaching point information is changed by the point changing unit, generates the automatic operation instruction, based on the changed teaching point information, and the operation control unit automatically operates the slewing device and the attachment, based on the automatic operation instruction generated by the instruction generating unit.

According to the present invention, work efficiency can be improved.

BRIEF DESCRIPTION OF DRAWINGS

FIG. 17 depicts an example of a correspondence relationship between types of operations carried out and specific operation patterns in the third embodiment of the present invention.

DESCRIPTION OF EMBODIMENTS

Preferred embodiments of the present invention will hereinafter be described with reference to the drawings. The following embodiments are examples of embodiment of the present invention, and do not put limits on the technical scope of the present invention.

First Embodiment

Figure 1:
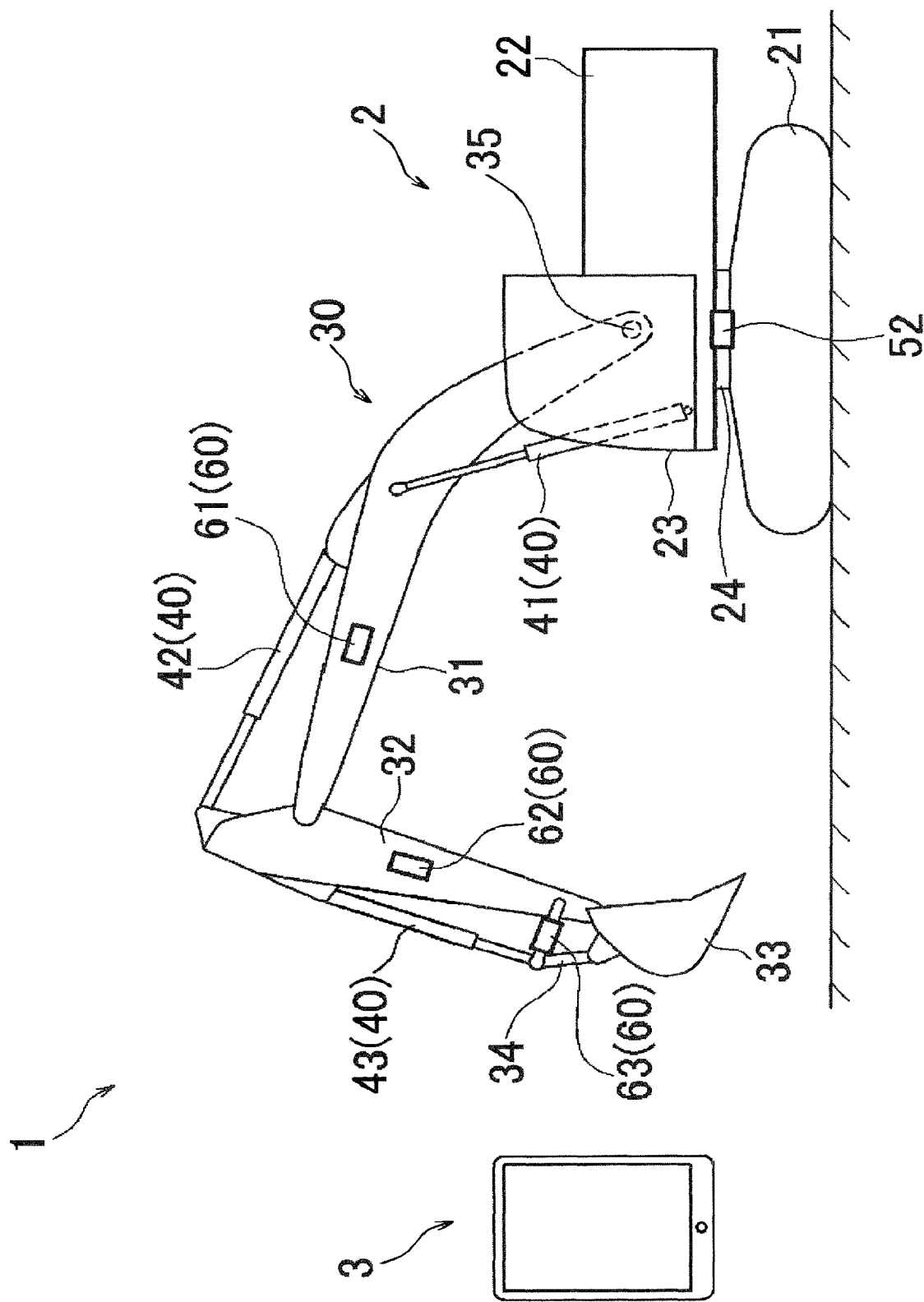
FIG. 1 is a diagram showing a configuration of an operation instruction system according to a first embodiment of the present invention.

FIG. 1 is a diagram showing a configuration of an operation instruction system according to a first embodiment of the present invention.

An operation instruction system 1 according to the first embodiment of the present invention teaches operations to a work machine 2. As shown in FIG. 1, the operation instruction system 1 includes the work machine 2, and a mobile terminal 3 capable of communicating with the work machine 2 via a network.

As shown in FIG. 1, the work machine 2 is a machine that carries out work with an attachment 30, and is provided as, for example, a hydraulic excavator. The work machine 2 includes a lower travelling body 21, an upper slewing body 22, a stewing device 24, the attachment 30, and a cylinder 40.

The lower travelling body 21 causes the work machine 2 to run, and is provided with, for example, a crawler. The upper slewing body 22 is attached rotatably to the top of the lower travelling body 21. A cab (cabin) 23 is provided on the front of the upper slewing body 22. The slewing device 24 causes the upper slewing body 22 to slew.

The attachment 30 is attached to the upper slewing body 22 in such a way as to be vertically rotatable. The attachment 30 includes a boom 31, an arm 32, and a bucket 33. The boom 31 is attached to the upper slewing body 22 in such a way as to be capable of swinging (moving up and down). The arm 32 is attached rotatably to the boom 31. The bucket 33 is attached rotatably to the arm 32. The bucket 33 excavates, smooths, and scoops work subjects, such as earth and sand.

The cylinder 40 rotates the attachment 30 hydraulically. The cylinder 40 is a hydraulic telescopic cylinder. The cylinder 40 includes a boom cylinder 41, an arm cylinder 42, and a bucket cylinder 43.

The boom cylinder 41 drives and rotates the boom 31 relative to the upper slewing body 22. The base end of the boom cylinder 41 is attached rotatably to the upper slewing body 22. The front end of the boom cylinder 41 is attached rotatably to the boom 31.

The arm cylinder 42 drives and rotates the arm 32 relative to the boom 31. The base end of the arm cylinder 42 is attached rotatably to the boom 31. The front end of the arm cylinder 42 is attached rotatably to the arm 32.

The bucket cylinder 43 drives and rotates the bucket 33 relative to the arm 32. The base end of the bucket cylinder 43 is attached rotatably to the arm 32. The front end of the bucket cylinder 43 is attached rotatably to a link member 34 attached rotatably to the bucket 33.

The work machine 2 further includes an operation lever 51 (see FIG. 2), an angle sensor 52, and a tilt angle sensor 60.

The operation lever 51 is operated by an operator to actuate the slewing device 24 and the attachment 30. The operation lever 51 is disposed in the cab 23.

The angle sensor (slewing angle detection device) 52 detects a slewing angle of the upper slewing body 22 relative to the lower travelling body 21. The angle sensor 52 is, for example, an encoder, a resolver, or a gyro sensor. In the first embodiment, a slewing angle of the upper slewing body 22 when the front of the upper slewing body 22 coincides with the front of the lower travelling body 21 is defined as 0°.

The tilt angle sensor (orientation detection device) 60 detects an orientation of the attachment 30. The tilt angle sensor 60 includes a boom tilt angle sensor 61, an arm tilt angle sensor 62, and a bucket tilt angle sensor 63.

The boom tilt angle sensor 61 is attached to the boom 31, and detects an orientation of the boom 31. The boom tilt angle sensor 61 is a sensor that acquires a tilt angle of the boom 31 against a horizontal line, and is provided as, for example, a tilt (acceleration) sensor or the like. The boom tilt angle sensor 61 may be a rotation angle sensor that detects a rotation angle of a boom foot pin (boom base end) or a stroke sensor that detects a stroke amount of the boom cylinder 41.

The arm tilt angle sensor 62 is attached to the arm 32 and detects an orientation of the arm 32. The arm tilt angle sensor 62 is a sensor that acquires a tilt angle of the arm 32 against a horizontal line, and is provided as, for example, a tilt (acceleration) sensor or the like. The arm tilt angle sensor 62 may be a rotation angle sensor that detects a rotation angle of an arm connecting pin (arm base end) or a stroke sensor that detects a stroke amount of the arm cylinder 42.

The bucket tilt angle sensor 63 is attached to the link member 34 and detects an orientation of the bucket 33. The bucket tilt angle sensor 63 is a sensor that acquires a tilt angle of the bucket 33 against a horizontal line, and is provided as, for example, a tilt (acceleration) sensor or the like. The bucket tilt angle sensor 63 may be a rotation angle sensor that detects a rotation angle of a bucket connecting pin (bucket base end) or a stroke sensor that detects a stroke amount of the bucket cylinder 43.

Figure 2:
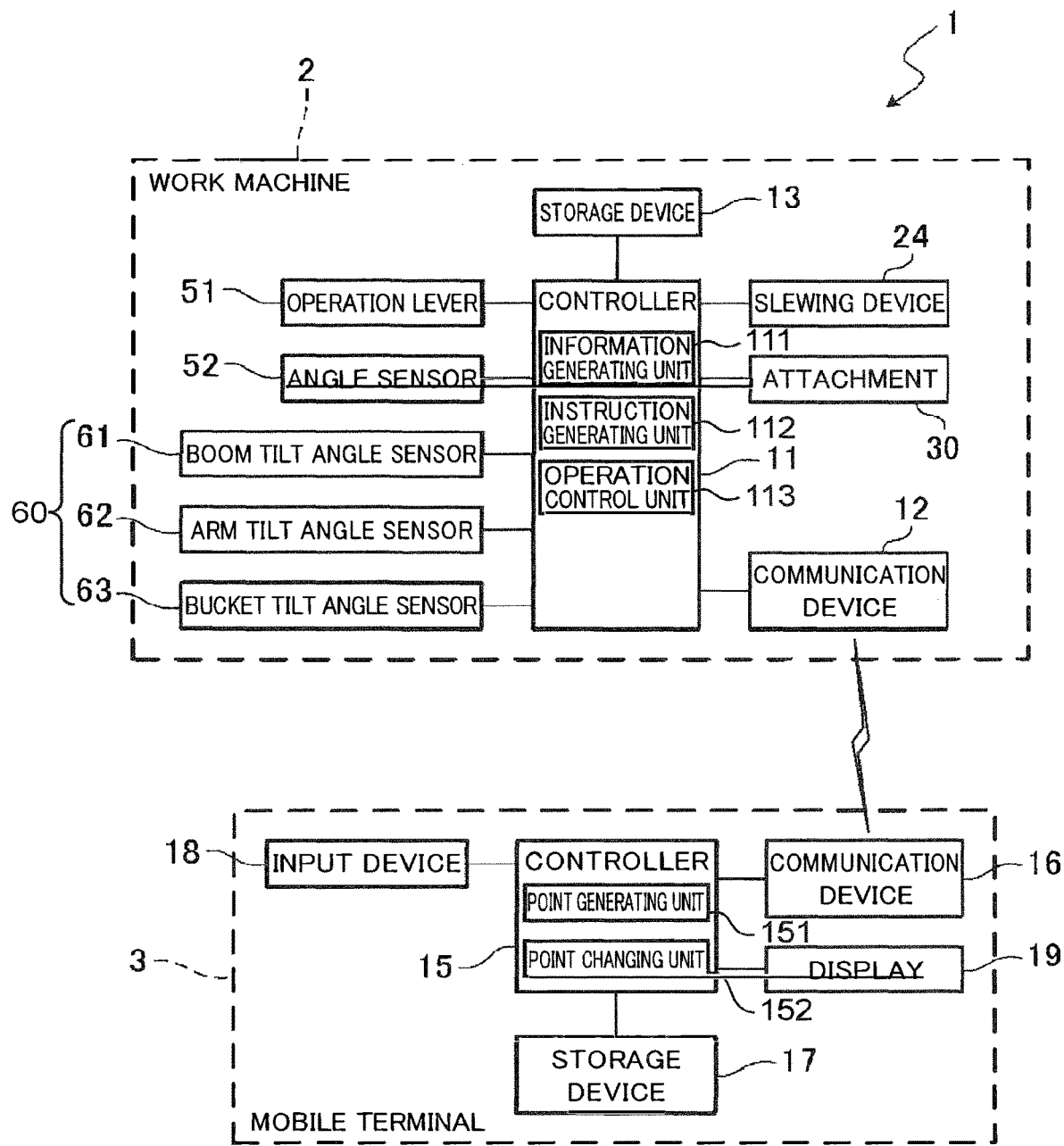
FIG. 2 is a block diagram showing a configuration of the operation instruction system according to the first embodiment of the present invention.

FIG. 2 is a block diagram showing a configuration of the operation instruction system according to the first embodiment of the present invention.

As shown in FIG. 2, the work machine 2 includes a controller 11, a communication device 12, a storage device 13, the slewing device 24, the attachment 30, the operation lever 51, the angle sensor 52, and the tilt angle sensor 60.

The communication device 12 communicates with a communication device 16 (to be described later) of the mobile terminal 3. The communication device 12 transmits/receives various pieces of information to/from the mobile terminal 3.

The controller 11 is, for example, a central processing unit (CPU), executing various arithmetic processes, based on programs and data stored in the storage device 13. The controller 11 includes an information generating unit 111, an instruction generating unit 112, and an operation control unit 113.

The storage device 13 is, for example, a flash memory or a magnetic disk, storing various programs and data and functioning also as a work memory for the controller 11.

The storage device 13 stores orientation information generated by the information generating unit 111 or a teaching point, which will be described later. The storage device 13 stores teaching point information associating a teaching position that teaches the work machine 2 a position of the attachment 30 in a series of movements to be performed by the work machine 2 with orientation information indicating a target orientation at the teaching position.

The information generating unit 111 generates orientation information on the work machine 2. Specifically, the controller 11 generates orientation information, based on a slewing angle of the upper slewing body 22 that is detected by the angle sensor 52 and on an orientation of the attachment 30 that is detected by the tilt angle sensor 60.

The communication device 12 receives an orientation information request signal requesting orientation information. The information generating unit 111 generates orientation information when the communication device 12 receives the orientation information request signal. At this time, the orientation information is generated in a state in which the front end of the bucket 33 is moved by the operator to a given teaching position. The communication device 12 transmits the orientation information generated by the information generating unit 111 to the mobile terminal 3.

The communication device 12 receives teaching point information transmitted by the mobile terminal 3.

The instruction generating unit 112 generates an instruction for operating the work machine 2. Based on teaching point information generated by the mobile terminal 3, the instruction generating unit 112 generates an automatic operation instruction for automatically operating the slewing device 24 and the attachment 30.

When teaching point information is changed by the mobile terminal 3, the instruction generating unit 112 generates an automatic operation instruction, based on the changed teaching point information.

The operation control unit 113 operates the slewing device 24 and the attachment 30, based on an instruction generated by the instruction generating unit 112. The operation control unit 113 automatically operates the slewing device 24 and the attachment 30, based on an automatic operation instruction generated by the instruction generating unit 112. The work machine 2 is thus operated automatically, based on the automatic operation instruction.

A configuration of the mobile terminal 3 will then be described.

As shown in FIG. 1, the mobile terminal 3 is operated by a worker present in a work site, and is provided as, for example, a tablet terminal. The mobile terminal 3 may be a smartphone or the like. The worker who operates the mobile terminal 3 and the operator who operates the work machine 2 may be the same person or may be different persons.

As shown in FIG. 2, the mobile terminal 3 includes a controller 15, the communication device 16, a storage device 17, an input device 18, and a display 19.

The communication device 16 communicates with the communication device 12 of the work machine 2. The communication device 16 transmits/receives various pieces of information to/from the work machine 2.

The communication device 16 transmits an orientation information request signal that requests the work machine 2 of orientation information, to the work machine 2. The communication device 16 receives the orientation information transmitted by the work machine 2.

The controller 15 is, for example, a CPU, executing various arithmetic processes, based on the programs and data stored in the storage device 17. The controller 15 includes a point generating unit 151 and a point changing unit 152.

The point generating unit 151 generates teaching point information associating a teaching position that teaches the work machine 2 a position of the attachment 30 in a series of movements to be performed by the work machine 2 with orientation information indicating a target orientation at the teaching position, based on orientation information from the work machine 2 that the communication device 16 receives. More specifically, the position of the attachment 30 is indicated as the position of the front end of the bucket 33.

The point changing unit 152 changes teaching point information generated by the point generating unit 151.

The communication device 16 transmits teaching point information generated by the point generating unit 151 to the work machine 2. In addition, the communication device 16 transmits teaching point information changed by the point changing unit 152 to the work machine 2.

The storage device 17 is, for example, a flash memory or a magnetic disk, storing various programs and data and functioning also as a work memory for the controller 15.

The storage device 17 stores orientation information received from the work machine 2 or teaching point information generated by the point generating unit 151.

The input device 18 receives the operator's input, and is provided as, for example, a touch panel. The input device 18 may be a keyboard or the like. The input device 18 accepts a change of teaching point information generated by the point generating unit 151, the change being made by the worker. The input device 18 is an example of a change acceptance unit. The point changing unit 152 changes teaching point information, based on the contents of the change accepted by the input device 18.

The teaching point information will then be described.

An automatic operation instruction according to the first embodiment causes the work machine 2 to perform a series of movements (operations): excavating the ground with the bucket 33 and discharging scooped earth and sand onto the load-carrying platform of a dump truck. A place onto which earth and sand is discharged is not limited to the load-carrying platform of the dump truck. Earth and sand may be discharged onto earth and sand pits or the like. The teaching point information necessary for generating an automatic operation instruction will hereinafter be described.

Figure 3:
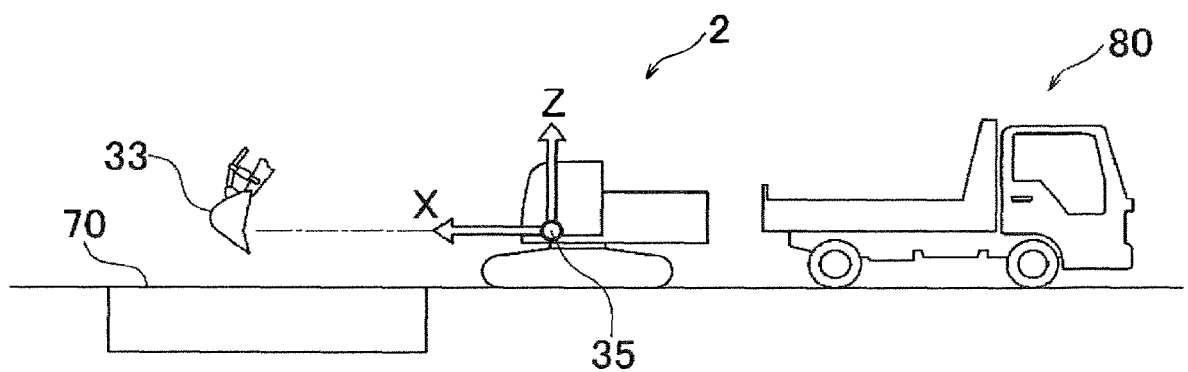
FIG. 3 is a side view of a work site according to the first embodiment of the present invention.

FIG. 3 is a side view of a work site according to the first embodiment of the present invention.

As shown in FIG. 3, the ground 70 to be excavated lies in front of the work machine 2 (the left side on the paper surface), and a dump truck 80 is behind the work machine 2 (the right side on the paper surface). With respect to a boom foot pin 35 (see FIG. 1) defined as the origin, the boom foot pin 35 anchoring the base end of the boom 31 to the upper slewing body 22, an X-axis is set in the horizontal direction (the front-to-rear direction of the work machine 2) and a Z-axis is set in the vertical direction (the up-and-down direction of the work machine 2). In FIG. 3, the bucket 33 of the attachment 30 is depicted hut the rest of the attachment 30 is not depicted.

The teaching point information required in the first embodiment is generated at seven teaching positions. The seven teaching positions include a reference position P1, a final excavation depth position P2, an excavation end position P3, a scooping position P4, a contact avoiding position P5, a soil discharge position P6, and an excavation start position P7. The operation the work machine 2 carries out in the first embodiment is an excavation operation of excavating an excavation subject and discharging scooped soil onto the dump truck 80. The operation of the work machine 2 is not limited to the excavation operation, and may be a different operation.

Figure 4:
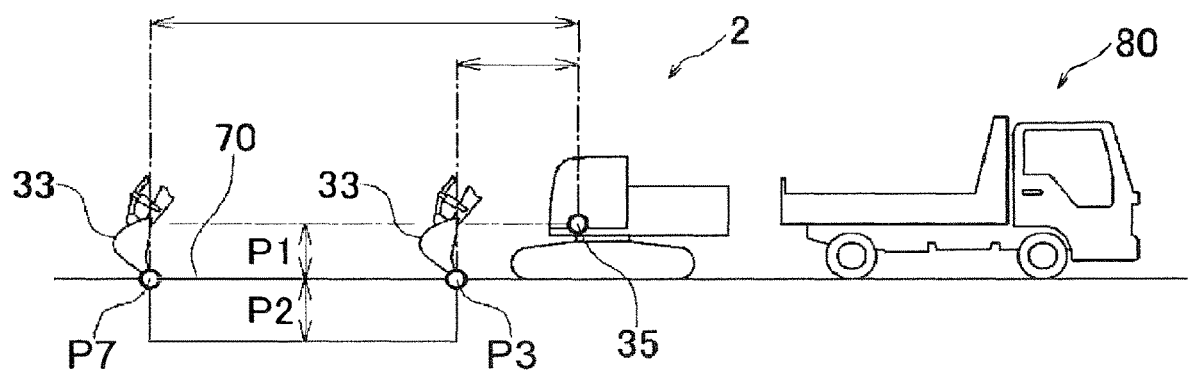
FIG. 4 is a side view for explaining a reference position, a final excavation depth position, an excavation start position, and an excavation end position in the first embodiment of the present invention.

FIG. 4 is a side view for explaining the reference position, the final excavation depth position, the excavation start position, and the excavation end position in the first embodiment of the present invention.

As shown in FIG. 4, the reference position P1 represents a height in the Z direction from the boom foot pin 35 to an arbitrarily set position. For example, when the height of a structure, such as an earth and sand pit, is clearly known, the reference position P1 indicates a height from the boom foot pin 35 to the top of the structure. In addition, when a mark reflecting a field survey, such as a finishing stake, is present, the reference position P1 indicates a height from the boom foot pin 35 to such a mark. The reference position P1 is set arbitrarily in the X direction. In FIG. 4, the reference position P1 indicates a height from the boom foot pin 35 to a finishing stake (not shown) set on the ground 70 to be excavated.

The final excavation depth position P2 represents a depth to be finally reached by excavation of the ground 70 to be excavated. The final excavation depth position P2 is set by numerical value input, as a depth with respect to the reference position P1.

The excavation start position P7 represents a position to start excavation, and includes information on x-coordinates and z-coordinates of the front end of the bucket 33 and on a stewing angle of the upper slewing body 22 relative to the lower travelling body 21.

The excavation end position P3 represents a position to end excavation, and includes information on x-coordinates and z-coordinates of the front end of the bucket 33 and on a slewing angle of the upper slewing body 22 relative to the lower travelling body 21.

Figure 5:
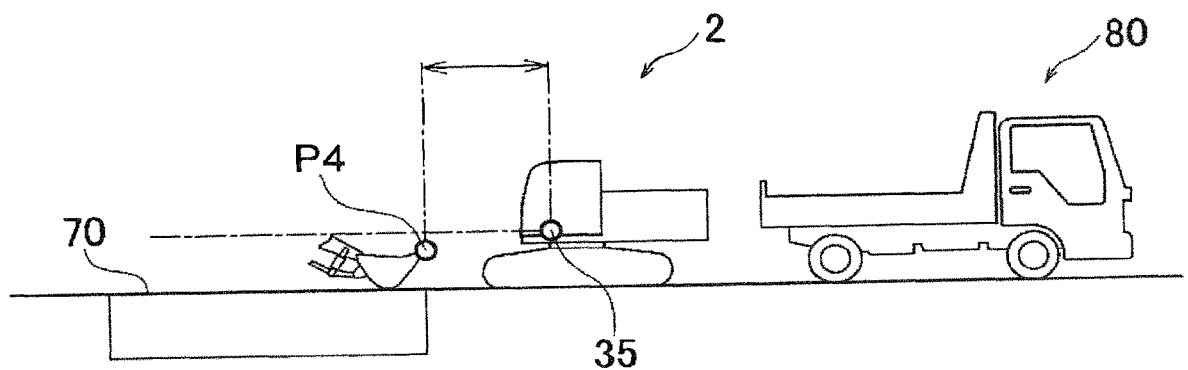
FIG. 5 is a side view for explaining a scooping position in the first embodiment of the present invention.

FIG. 5 is a side view for explaining the scooping position in the first embodiment of the present invention.

As shown in FIG. 5, the scooping position P4 represents a position at which the bucket 33 scoops up earth and sand, and includes x-coordinate and z-coordinates of the front end of the bucket 33.

Figure 6:
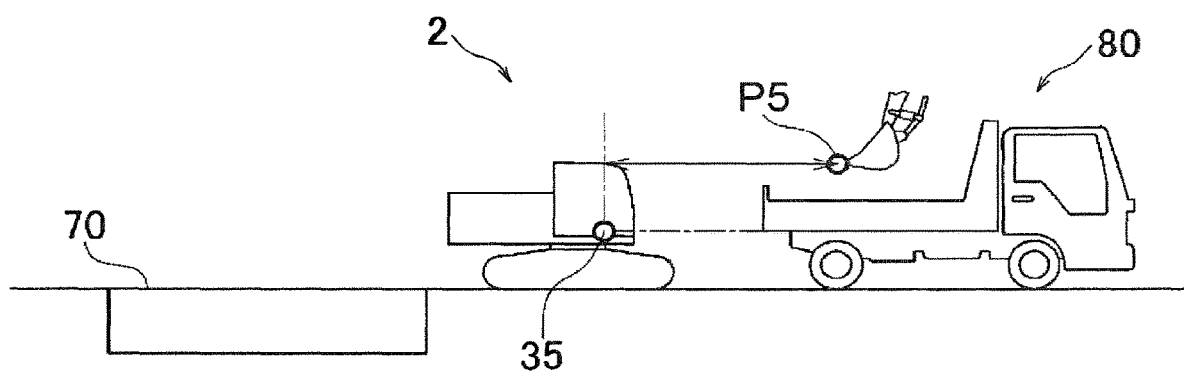
FIG. 6 is a side view for explaining a contact avoiding position in the first embodiment of the present invention.
Figure 7:
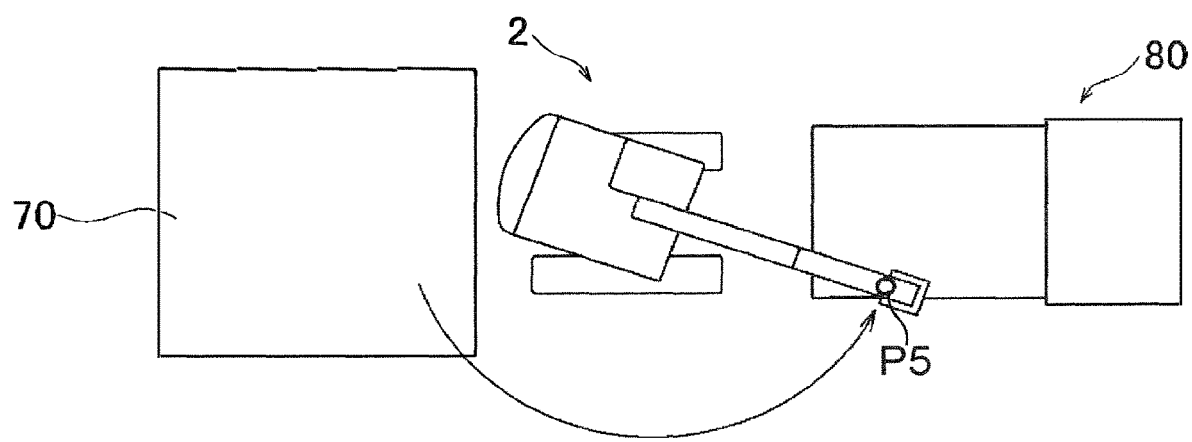
FIG. 7 is a top view for explaining the contact avoiding position in the first embodiment of the present invention.

FIG. 6 is a side view for explaining the contact avoiding position in the first embodiment of the present invention, and FIG. 7 is a top view for explaining the contact avoiding position in the first embodiment of the present invention.

As shown in FIGS. 6 and 7, the contact avoiding position P5 is a position above the load-carrying platform of the dump truck 80, at which position the bucket 33 and the like avoids coming into contact with the dump truck 80. The contact avoiding position P5 includes information on x-coordinates and z-coordinates of the front end of the bucket 33 and on a slewing angle of the upper slewing body 22 relative to the lower travelling body 21.

Figure 8:
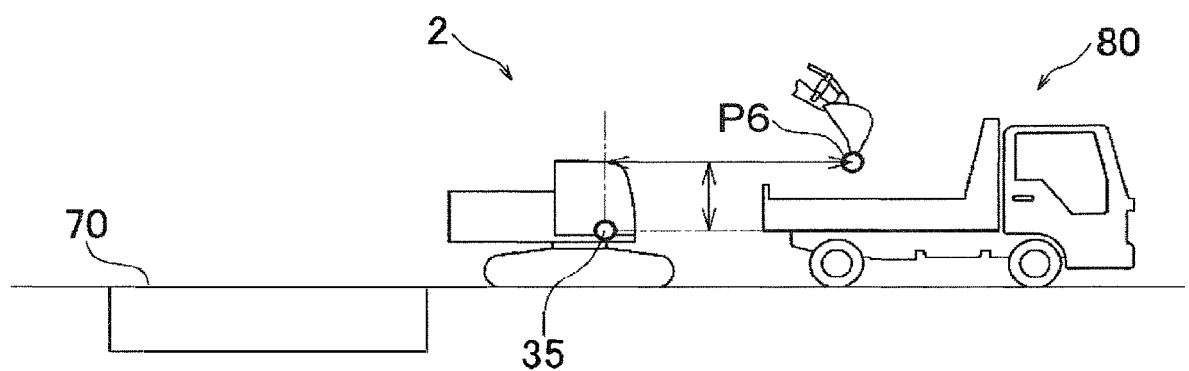
FIG. 8 is a side view for explaining a soil discharge position in the first embodiment of the present invention.
Figure 9:
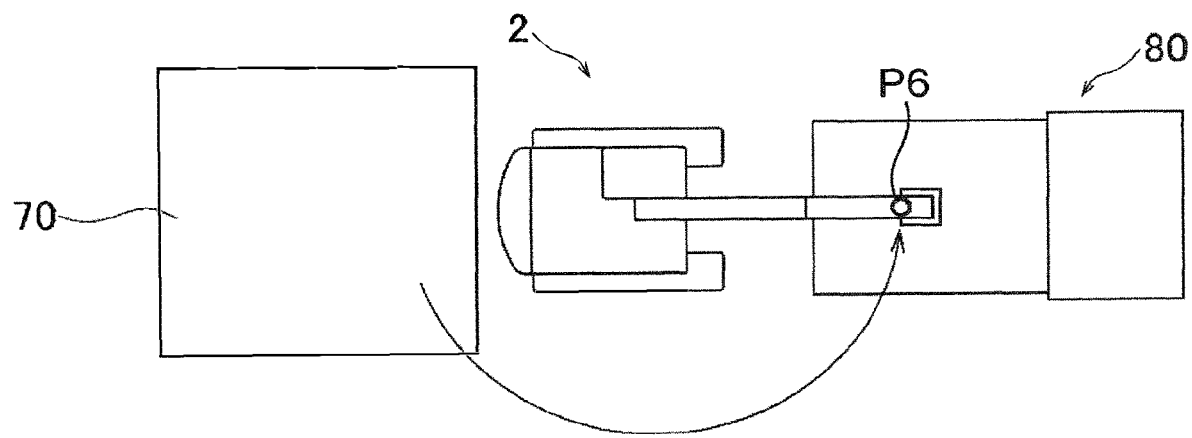
FIG. 9 is a top view for explaining the soil discharge position in the first embodiment of the present invention.

FIG. 8 is a side view for explaining the soil discharge position in the first embodiment of the present invention, and FIG. 9 is a top view for explaining the soil discharge position in the first embodiment of the present invention.

As shown in FIGS. 8 and 9, the soil discharge position P6 represent a position at which the soil is discharged onto the load-carrying platform of the dump truck 80, and includes information on x-coordinates and z-coordinates of the front end of the bucket 33 and on a slewing angle of the upper stewing body 22 relative to the lower travelling body 21.

A procedure for generating the teaching point information will then be described. First, on the mobile terminal 3, an application program for creating the teaching point information is executed. When the application program is executed, for example, the display 19 of the mobile terminal 3 shows a work movement selection screen for accepting the worker's selection of a work movement for generating the teaching point information out of a plurality of types of work movements. On the displayed work movement selection screen, the worker selects the work movement for generating the teaching point information. For example, the worker selects a work movement of excavating the ground with the bucket 33 and discharging scooped earth and sand onto the load-carrying platform of the dump truck. The input device 18 of the mobile terminal 3 accepts the worker's selection of the work movement. Subsequently, a process of sequentially acquiring orientation information at the above seven teaching positions is executed.

Figure 10:
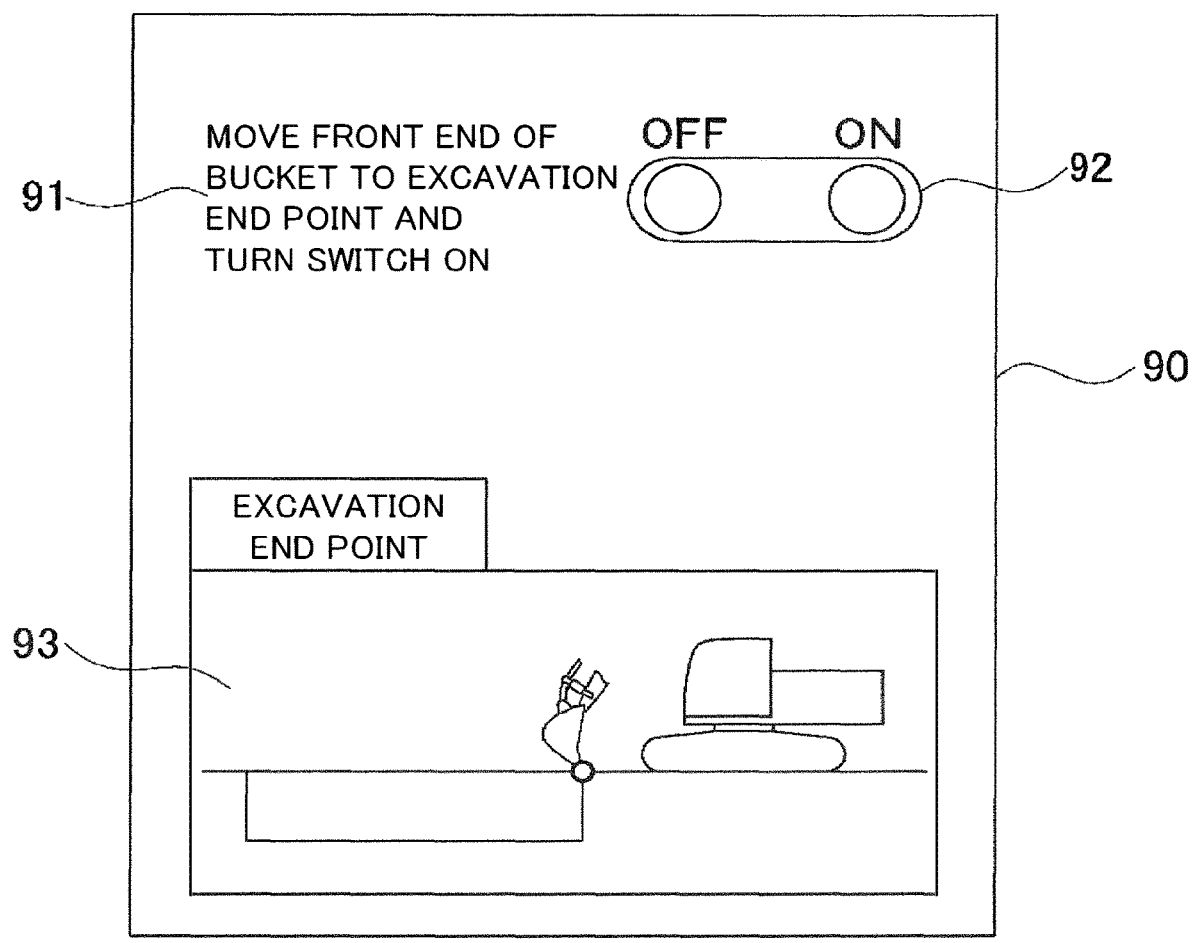
FIG. 10 depicts an example of a setting screen that is displayed on the display of a mobile terminal in a teaching point information generation process of the first embodiment of the present invention.

FIG. 10 depicts an example of a setting screen that is displayed on the display of the mobile terminal in a teaching point information generation process of the first embodiment of the present invention.

In the teaching point information generation process, the display 19 of the mobile terminal 3 displays a setting screen 90 as shown in FIG. 10. The setting screen 90 puts on screen a teaching operation to be carried out by the operator of the work machine 2. The setting screen 90 puts on screen an explanatory note 91 explaining the teaching operation performed by the operator of the work machine 2, a switch image 92, and an illustration image 93 showing a teaching position at which orientation information is acquired. In FIG. 10, the setting screen 90 for a case where orientation information at the excavation end position P3 is acquired.

The operator of the work machine 2 moves the front end of the bucket 33 to the teaching position. The operation lever 51 of the work machine 2 accepts an operation by the operator. When orientation information at the excavation end position P3 is acquired, the operator of the work machine 2 operates the operation lever 51 so as to move the front end of the bucket 33 to the excavation end position P3.

Subsequently, the worker carrying the mobile terminal 3 switches the switch image 92 from "OFF" to "ON" at a point of time at which the front end of the bucket 33 has been moved to the teaching position (excavation end position P3).

When the switch image 92 is switched to "ON", the communication device 16 of the mobile terminal 3 transmits an orientation information request signal for requesting the work machine 2 of orientation information, to the work machine 2.

Subsequently, the communication device 12 of the work machine 2 receives the orientation information request signal transmitted by the mobile terminal 3.

Subsequently, the information generating unit 111 of the work machine 2 generates orientation information at a point of time at which the orientation information request signal is received. The orientation information indicates a slewing angle of the upper stewing body 22 and an orientation of the attachment 30 at the excavation end position P3.

Subsequently, the communication device 12 transmits the orientation information generated by the information generating unit 111 to the mobile terminal 3.

Subsequently, the communication device 16 of the mobile terminal 3 receives the orientation information transmitted by the work machine 2.

Subsequently, based on the orientation information received by the communication device 16, the point generating unit 151 generates teaching point information associating a teaching position that teaches the work machine 2 a position of the attachment 30 in a series of movements to be performed by the work machine 2 with orientation information indicating a target orientation at the teaching position. For example, the point generating unit 151 generates teaching point information associating the excavation end position P3 put on the setting screen 90 with the orientation information at the excavation end position P3, the orientation information being received by the communication device 16.

Subsequently, the point generating unit 151 stores the generated teaching point information in the storage device 17.

When such a teaching operation is carried out for all teaching positions, the point generating unit 151 of the mobile terminal 3 generates seven pieces of teaching point information, based on seven pieces of orientation information. These pieces of teaching point information are shared with the work machine 2. In other words, the communication device 16 of the mobile terminal 3 transmits the teaching point information generated by the point generating unit 151 to the work machine 2. The communication device 12 of the work machine 2 receives the teaching point information transmitted by the mobile terminal 3, and stores the received teaching point information in the storage device 13.

The instruction generating unit 112 of the work machine 2 creates an automatic operation instruction for causing the work machine 2 to carry out a series of movements (operations), including a movement of moving the front end of the bucket 33 from the excavation start position P7 to the excavation end position P3 to excavate the excavation subject, a movement of moving the front end of the bucket 33 to the scooping position P4 to scoop up earth and sand, a movement of moving the front end of the bucket 33 to the contact avoiding position P5 while causing the upper slewing body 22 to turn toward the dump truck 80, a movement of moving the front end of the bucket 33 to the soil discharge position P6 to discharge the soil, a movement of causing the front end of the buckets 33 to discharge the soil at the soil discharge position P6, and a movement of returning the front end of the bucket 33 to the excavation start position P7. Based on this automatic operation instruction, the work machine 2 is automatically operated.

The operation control unit 113 automatically operates the slewing devices 24 and the attachment 30, based on the automatic operation instruction generated by the instruction generating unit 112.

Changing the teaching point information will then be described.

In accordance with generated teaching contents (e.g., seven pieces of teaching point information), the work machine 2 is automatically operated repeatedly to work on a plurality of work subjects. There may be a case, however, where the position or shape of a certain work subject is different from the position or shape of the same indicated in the generated teaching contents. In such a case, the point changing unit 152 changes the teaching point information generated by the point generating unit 151.

Figure 11:
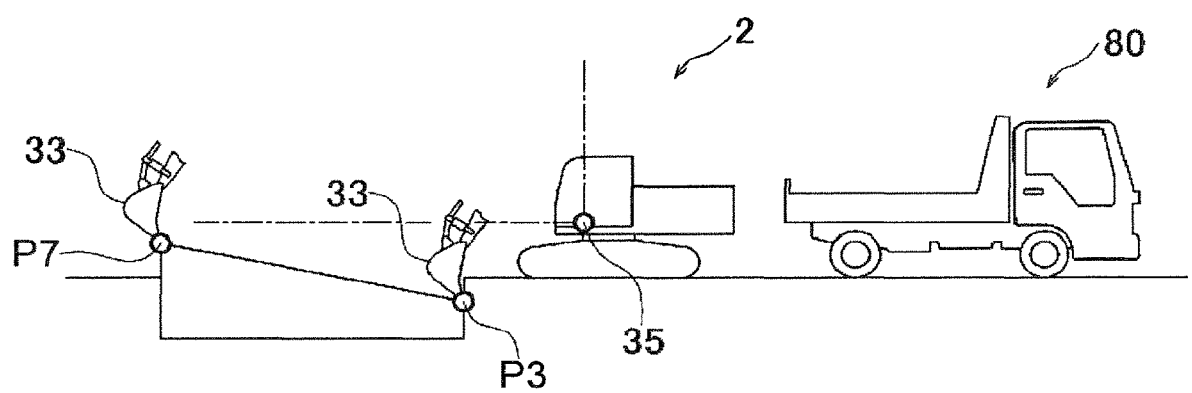
FIG. 11 is a side view for explaining a change in the excavation start position and the excavation end position in the first embodiment of the present invention.

FIG. 11 is a side view for explaining a change in the excavation start position and the excavation end position in the first embodiment of the present invention.

A case is considered where, for example, the excavation start position P7 of the work site is higher than the excavation start position P7 indicated by the current teaching information, and the excavation end position P3 of the work site is lower than the excavation end position P3 indicated by the current teaching information, as shown in FIG. 11. In this case, the worker at the work site runs an application program for changing teaching point information on the mobile terminal 3. This application program calls teaching point information having been set earlier. The point changing unit 152 then changes z-coordinates of the excavation start position P7 and z-coordinates of the excavation end position P3 in order.

For example, the display 19 of the mobile terminal 3 displays a change acceptance screen for accepting the worker's selection of a teaching position to be changed. On the displayed change acceptance screen, the worker selects the teaching position to be changed. The input device 18 of the mobile terminal 3 then accepts the change of the teaching position by the worker. When changing the excavation start position P7, the worker moves an image showing the bucket 33 that is displayed on the change acceptance screen, from a current excavation start position to a changed excavation start position. The point changing unit 152 changes z-coordinates of the excavation start position P7 in accordance with the changed excavation start position P7 resulting from teaching position change accepted by the input device 18. The point changing unit 152 changes also orientation information according to the changed excavation start position P7.

Instead of accepting input for moving the image showing the bucket 33 from the current excavation start position to the changed excavation start position, the input device 18 may accept input of a value indicating in what degree the excavation start position is to be changed in the Z-axis direction.

Figure 12:
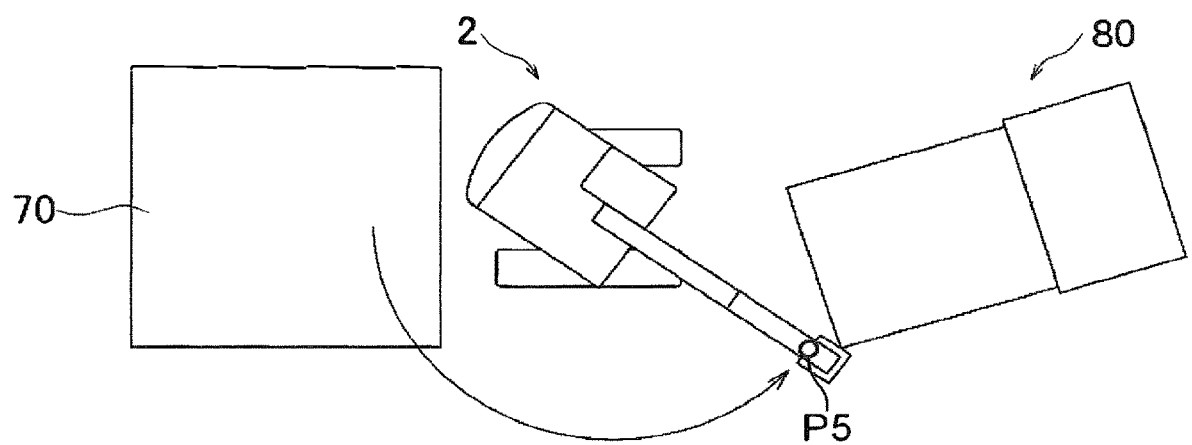
FIG. 12 is a top view for explaining a change in the contact avoiding position and the soil discharge position in the first embodiment of the present invention.

FIG. 12 is a top view for explaining a change in the contact avoiding position and the soil discharge position in the first embodiment of the present invention.

Another case is considered where the stop position of the dump truck 80 at the work site is tilted against a reference stop position, as shown in FIG. 12. In this case, the worker at the work site runs an application program for changing teaching point information on the mobile terminal 3. The point changing unit 152 changes a slewing angle of the upper slewing body 22 relative to the lower travelling body 21 at the contact avoiding position P5 and a slewing angle of the upper slewing body 22 relative to the lower travelling body 21 at the soil discharge position P6, in order.

For example, when changing the contact avoiding position P5, the worker moves an image showing the bucket 33 that is displayed on the change acceptance screen, from a current contact avoiding position to a changed contact avoiding position. The point changing unit 152 changes a slewing angle at the contact avoiding position P5 in accordance with the changed contact avoiding position P5 resulting from contact avoiding position change accepted by the input device 18. The point changing unit 152 changes also orientation information according to the changed contact avoiding position P5. When the contact avoiding position is changed, the point changing unit 152 may change not only the slewing angle but also the x-coordinates and the z-coordinates of the front end of the bucket 33.

Instead of moving the image showing the bucket 33 from the current contact avoiding position to the changed contact avoiding position, the input device 18 may accept input of a value indicating in what degree the contact avoiding position is to be changed. The soil discharge position P6 is changed in the same manner as the contact avoiding position P5 is.

The point changing unit 152 stores changed teaching point information in the storage device 17.

The communication device 16 of the mobile terminal 3 transmits the teaching point information changed by the point changing unit 152 to the work machine 2. The communication device 12 of the work machine 2 receives the changed teaching point information, and stores the received changed teaching point information in the storage device 13. The instruction generating unit 112 generates an automatic operation instruction, based on the changed teaching point information. As a result, the work machine 2 is automatically operated, based on the changed automatic operation instruction.

As described above, according to the operation instruction system 1 of the first embodiment, the slewing device 24 and the attachment 30 of the work machine 2 are automatically operated, based on an automatic operation instruction. When teaching point information is changed by the mobile terminal 3, an automatic operation instruction is generated, based on the changed teaching point information, and the slewing device 24 and the attachment 30 of the work machine 2 are automatically operated, based on the generated automatic operation instruction. Because the teaching point information is changed by the mobile terminal 3, the worker does not need to operate the work machine 2 in order to generate the changed teaching point information. By bringing the mobile terminal 3 to the work site, therefore, the worker is able to change the teaching point information on site while checking the work subject. Hence work efficiency can be improved.

Second Embodiment

According to a second embodiment, the operation instruction system further includes a surrounding condition acquiring device that acquires the surrounding conditions of the work site.

Figure 13:
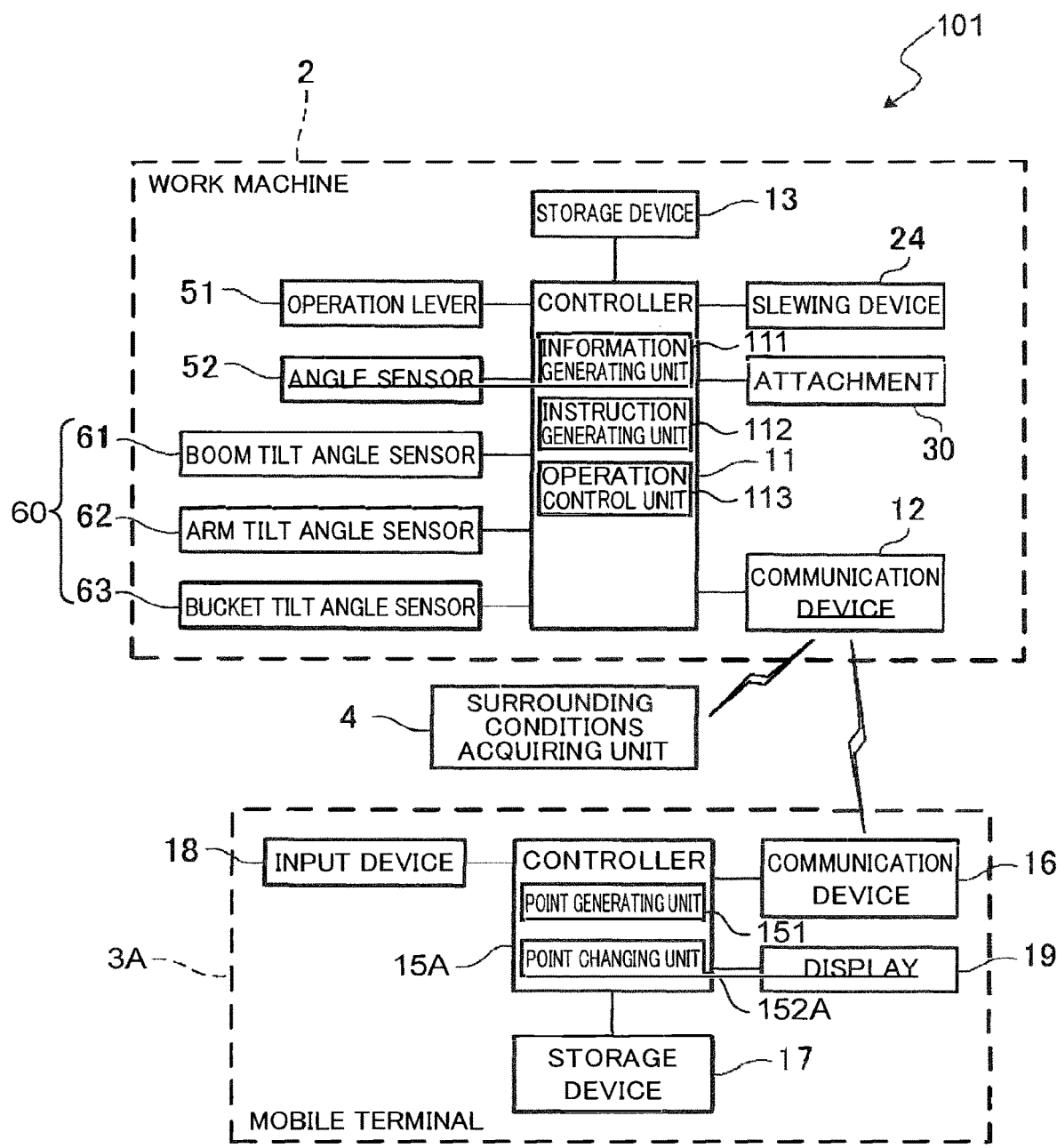
FIG. 13 is a block diagram showing a configuration of an operation instruction system according to a second embodiment of the present invention.
Figure 14:
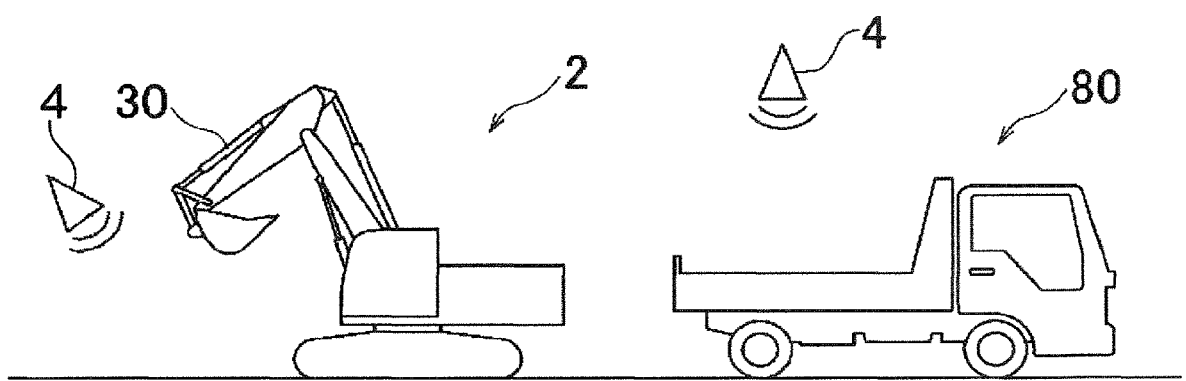
FIG. 14 is a side view of a work site according to the second embodiment of the present invention.

FIG. 13 is a block diagram showing a configuration of an operation instruction system according to the second embodiment of the present invention, and FIG. 14 is a side view of a work site according to the second embodiment of the present invention.

As shown in FIG. 13, an operation instruction system 101 includes the work machine 2, a mobile terminal 3A, and a surrounding condition acquiring device 4. In the second embodiment, the same constituent elements as described in the first embodiment will be denoted by the same reference signs and omitted in further description.

The surrounding condition acquiring device 4 acquires the surrounding conditions of the work site. The surrounding condition acquiring device 4 is, for example, a camera or a LIDAR (Light Detection And Ranging). The operation instruction system 101 may include one surrounding condition acquiring device 4 or may include a plurality of surrounding condition acquiring devices 4. As shown in FIG. 14, according to the second embodiment, the operation instruction system 101 includes a surrounding condition acquiring device 4 disposed at a position for acquiring the surrounding conditions of the attachment 30, and a surrounding condition acquiring device 4 disposed at a position for acquiring of the surrounding conditions of the stop position of the dump truck 80.

As shown in FIG. 13, each surrounding condition acquiring device 4 transmits acquired information indicating the surrounding conditions, to the controller 11 of the work machine 2 via the communication device 12. The controller 11 transmits the received information indicating the surrounding conditions, to the mobile terminal 3A via the communication device 12. The surrounding condition acquiring device 4 may directly transmit the acquired information indicating the surrounding situations, to the controller 15 via the communication device 16.

The mobile terminal 3A includes a controller 15A, the communication device 16, the storage device 17, the input device 18, and the display 19. The controller 15A includes the point generating unit 151, and a point changing unit 152A.

The point changing unit 152A of the mobile terminal 3A automatically changes teaching point information, based on surrounding conditions acquired by the surrounding condition acquiring device 4. In FIG. 14, for example, when an obstacle, such as a stone, is present in front of the attachment 30, the point changing unit 152A changes the excavation end position P3 or the scooping position P4 so that the attachment 30 does not interfere with the obstacle.

For example, when the surrounding condition acquiring device 4 is a camera, the surrounding condition acquiring device 4 photographs the surroundings of the attachment 30, thereby acquiring an image of the surroundings of the attachment 30. The point changing unit 152A analyzes the image, and detects the position and shape of the obstacle present in front of the work machine 2. When detecting the obstacle at the current excavation end position P3, the point changing unit 152A changes the excavation end position P3 and the scooping position P4 to positions where no obstacle is present.

When the dump truck 80 is too close to the work machine 2 with respect to a reference stop position or is tilted against the reference stop position, the point changing unit 152A changes the contact avoiding position P5 or the soil discharge position P6.

For example, when the surrounding condition acquiring device 4 is a camera, the surrounding condition acquiring device 4 photographs the dump truck 80 from above, thereby acquiring an image of the dump truck 80. The point changing unit 152A analyzes the image, and determines whether the dump truck 80 is stopped at the predetermined reference stop position. The point changing unit 152A then detects the position and shape of the obstacle present in front of the work machine 2. When determining that the dump truck 80 is not stopped at the reference stop position, the point changing unit 152A changes the contact avoiding position P5 to a position where the bucket does not come in contact the dump truck 80 and change also the soil discharge position P6 to a position above the load-carrying platform of the dump truck 80.

As a result, the movement of the work machine 2 in automatic operation can be corrected according to the surrounding conditions acquired by the surrounding condition acquiring device 4.

As described above, according to the operation instruction system 101 of the second embodiment, teaching point information is automatically changed, based on the surrounding conditions of the work site. As a result, for example, when an obstacle that interferes with the attachment 30 is detected or the dump truck 80, onto which the soil is discharged, moves, the movement the work machine 2 in automatic operation can be corrected automatically. Hence work efficiency can be improved.

Third Embodiment

An operation instruction system of a third embodiment will then be described with reference to drawings. The same constituent elements as described in the first embodiment and effects such constituent elements offer will be omitted in further description, and differences with the first embodiment will be mainly described. The same constituent elements as described in the first embodiment will be denoted by the same reference signs as used in the first embodiment.

A procedure for generating teaching point information will first be described.

In the operation instruction system 1 of the first embodiment, seven pieces of teaching point information are generated, and an automatic operation instruction is generated, based on these pieces of information. In this case, an operation carried out between adjacent teaching positions is determined by the controller 11 of the work machine 2. Specifically, as shown in FIG. 4, when teaching point information on the excavation start position P7 and the excavation end position P3 is generated, the operation control unit 113 of the controller 11 determines an operation to be carried out between the excavation start position P7 and the excavation end position P3 so that work starts at the excavation start position P7 and ends at the excavation end position P3. For example, the operation control unit 113 causes the bucket 33 to operate such that the front end of the bucket 33 moves along a straight line connecting the excavation start position P7 to the excavation end position P3. This operation determining process leaves a generated automatic operation instruction less detailed instruction.

Figure 15:
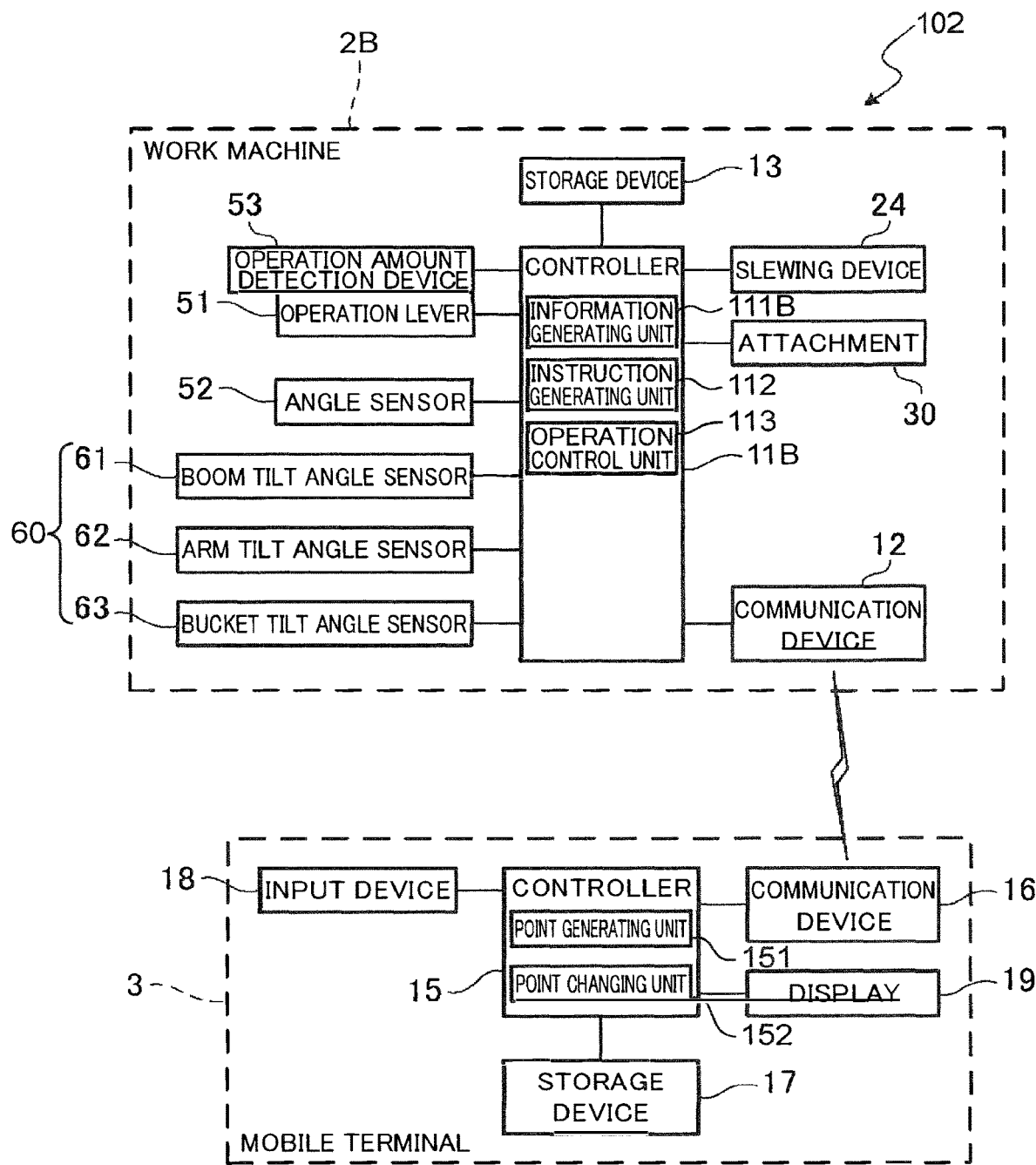
FIG. 15 is a block diagram showing a configuration of an operation instruction system according to a third embodiment of the present invention.

FIG. 15 is a block diagram showing a configuration of the operation instruction system according to the third embodiment of the present invention.

An operation instruction system 102 includes a work machine 2B, and the mobile terminal 3. The work machine 2B includes a controller 11B, the communication device 12, the storage device 13, the slewing device 24, the attachment 30, the operation lever 51, the angle sensor 52, an operation amount detection device 53, and the tilt angle sensor 60.

As shown in FIG. 15, the work machine 2B further includes the operation amount detection device 53. The operation amount detection device 53 continuously detects a type and an operation amount of operation of the operation lever 51. Types of operation of the operation lever 51 include raising the boom 31, lowering the boom 31, pushing the arm 32, pulling the arm 32, causing the bucket 33 to excavate, and causing the bucket 33 to discharge the soil.

The angle sensor 52 continuously detects a slewing angle of the upper slewing body 22, the slewing angles being changed continuously by operation of the operation lever 51. Similarly, the tilt angle sensor 60 continuously detects an orientation of the attachment 30, the orientations being changed continuously by operation of the operation lever 51.

The controller 11B of the work machine 2B includes an information generating unit 111B, the instruction generating unit 112, and the operation control unit 113.

The information generating unit 111B continuously generates orientation information that associates a type and an operation amount of operation of the operation lever 51, the type and the operation amount being detected continuously by the operation amount detection device 53, a slewing angle of the upper slewing body 22, the slewing angle being detected continuously by the angle sensor 52, and an orientation of the attachment 30, the orientation being detected continuously by the tilt angle sensor 60, with each other. This orientation information is generated when the operator operates the work machine 2B to cause the work machine 2B to actually carry out the same series of movements (operations) as the automatic operation.

Figure 16:
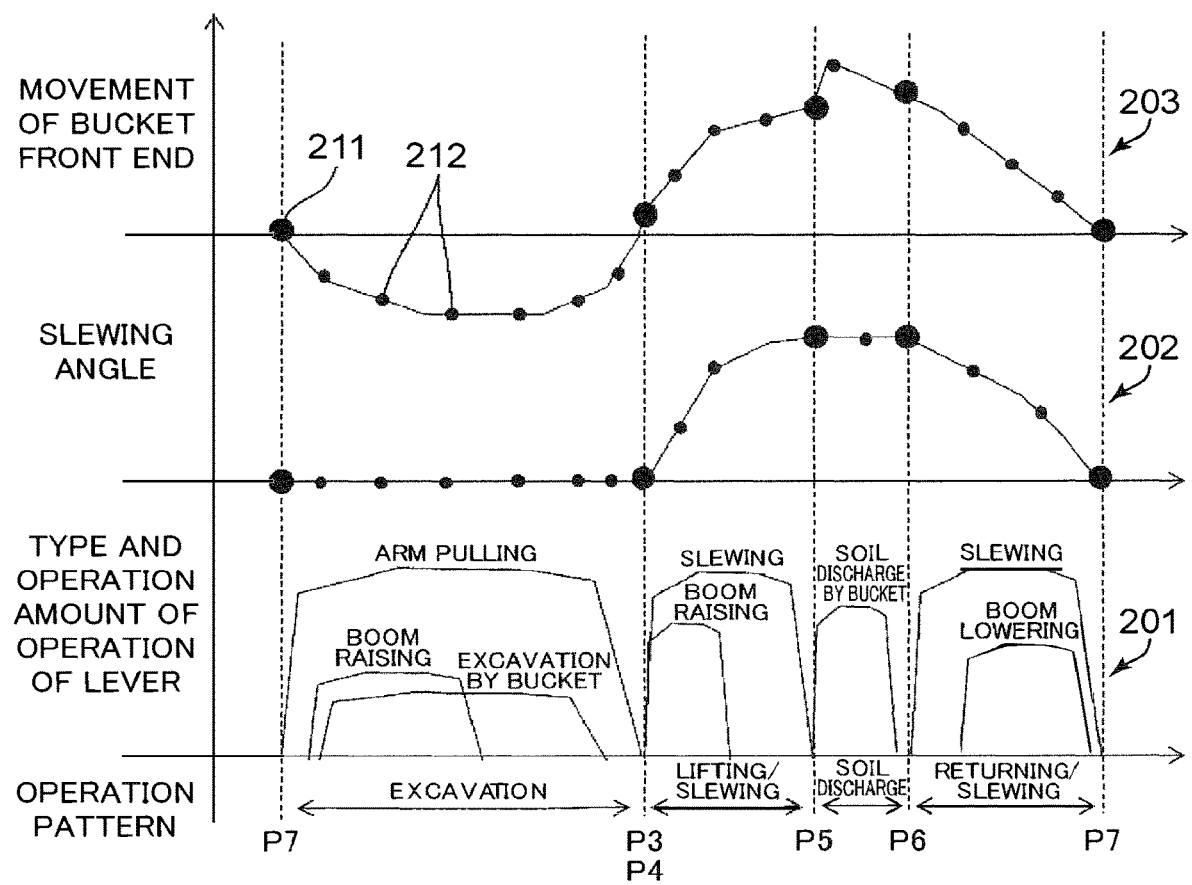
FIG. 16 depicts an example of orientation information generated in the third embodiment of the present invention.

FIG. 16 depicts an example of orientation information generated in the third embodiment of the present invention. The orientation information shown in FIG. 16 includes information 201 indicating a type and a continuous operation amount of operation of the operation lever 51, information 202 indicating a continuous slewing angle of the upper slewing body 22, and information 203 indicating a continuous movement of the front end of the bucket 33.

FIG. 17 depicts an example of a correspondence relationship between types of operations carried out by operating the operation lever 51 and specific operation patterns in the third embodiment of the present invention. FIG. 17 indicates whether operating the boom 31, operating the arm 32, operating the bucket 33, and slewing have been done in correspondence to operation patterns of excavation, lifting/slewing, soil discharge, and returning/slewing. In FIG. 17, an operation being done is indicated by a circle.

Based on the orientation information continuously generated by the information generating unit 111B of the work machine 2B, the point generating unit 151 of the controller 15 of the mobile terminal 3 extracts an operation pattern of the operation lever 51. Specifically, the point generating unit 151 extracts each of the operation patterns of excavation, lifting/slewing, soil discharge, and returning/slewing, based on the information 201 on the type and the operation amounts of operation of the operation lever 51, the information 201 being included in the orientation information. The point generating unit 151 then generates first teaching point information 211 that is teaching point information when the operation pattern of the operation lever 51 is switched, and second teaching point information 212 that is teaching point information when the operation pattern of the operation lever 51 is continued.

In FIG. 16, large black circles each indicates a point of time at which first teaching point information 211 is generated. Five pieces of first teaching point information 211 shown in FIG. 16 are equivalent respectively to five pieces of teaching point information (the excavation end position P3, the scooping position P4, the contact avoiding position P5, the soil discharge position P6, and the excavation start position P7) out of the above seven pieces of teaching point information. In FIG. 16, the excavation end position P3 and the scooping position P4 overlap each other. As can be seen by checking operation amounts of the operation lever 51 against operation patterns shown in FIG. 17, each piece of first teaching point information 211 is generated when the operation pattern of the operation lever 51 is switched. It should be noted that a point of time at which an operation of the operation lever 51 is started to increase its operation amount from zero is included in a point of time at which the operation pattern of the operation lever 51 has been switched. In addition, a point of time at which all operations of the operation lever 51 are ended to reduce the operation amount of the operation lever 51 to zero is included in a point of time at which the operation pattern of the operation lever 51 has been switched.

In FIG. 16, small black circles each indicate a point of time at which second teaching point information 212 is generated. Each of a plurality of pieces of second teaching point information 212 is generated between two pieces of first teaching point information 211. As can be seen by checking the operation amounts of the operation lever 51 against the operation patterns shown in FIG. 17, each of the pieces of second teaching point information 212 is generated when an operation pattern of the operation lever 51 is continued.

The instruction generating unit 112 of the controller 11 of the work machine 2B generates an automatic operation instruction, based on the first teaching point information 211 and the second teaching point information 212 that are generated by the point generating unit 151 of the mobile terminal 3. Generation of the first teaching point information 211 and the second teaching point information 212 allows the instruction generating unit 112 to generate an automatic operation instruction that is more detailed in contents. Automatic operation, therefore, causes the work machine 2 to make more complicated movements. In addition, when orientation information is generated by a skilled operator's operation, the skilled operator's operation can be reproduced by automatic operation.

Further, the point generating unit 151 of the mobile terminal 3 classifies orientation information indicating a series of movements into a plurality of pieces of orientation information, based on information on a type and an operation amount of operation of the operation lever 51, the information being included in the orientation information. In FIG. 16, points of time at which the operation pattern is switched include a point of time at which the operation of the operation lever 51 is started, that is, the operation amount of the operation lever 51 increases from zero, and a point of time at which following a decrease in the operation amount of the operation lever 51, a different type of operation is carried out. Based on points of time at which the operation pattern is switched and on a type of operation, the point generating unit 151 classifies orientation information indicating a series of movements into four pieces of orientation information corresponding to the operation patterns of excavation, lifting/slewing, soil discharge, and returning/slewing.

For example, the operation pattern corresponding to excavation continues in the period between a point of time at which an operation of pulling the arm 32 is started (a point of time at which the amount of operation of pulling the arm 32 increases from zero) and a point of time at which slewing of the upper slewing body 22 is started (a point of time at which the amount of operation of slewing the upper slewing body 22 increases from zero).

The operation pattern corresponding to the lifting/slewing continues in the period between the point of time at which slewing of the upper slewing body 22 is started (the point of time at which the amount of operation of slewing the upper slewing body 22 increases from zero) and a point of time at which the bucket 33 starts discharging the soil (a point of time at which the amount of operation of causing the bucket 33 to discharge the soil increases from zero).

The operation pattern corresponding to the soil discharge continues in the period between the point of time at which the bucket 33 starts discharging the soil (the point of time at which the amount of operation of causing the bucket 33 to discharge the soil increases from zero) and a point of time at which slewing of the upper slewing body 22 is started (a point of time at which the amount of operation of slewing the upper slewing body 22 increases from zero).

The operation pattern corresponding to returning/slewing continues in the period between the point of time at which slewing of the upper slewing body 22 is started (the point of time at which the amount of operation of slewing the upper slewing body 22 increases from zero) and a point of time at which slewing of the upper slewing body 22 is ended (a point of time at which the amount of operation of slewing the upper slewing body 22 decreases to zero).

The instruction generating unit 112 of the controller 11 of the work machine 2B generates an automatic operation instruction for each of the plurality of pieces of orientation information classified by the point generating unit 151 of the mobile terminal 3. By classifying the orientation information indicating a series of movements into the plurality of pieces of orientation information, a part of attachment 30 to be moved and a slewing angle of the upper slewing body 22 can be made clear for each of the classified pieces of orientation information. For example, from orientation information classified as information corresponding to the soil discharge period, it is understood that only the bucket 33 is rotated without slewing the upper slewing body 22. This makes it easy to generate an automatic operation instruction for each of the classified pieces of orientation information, thus reducing load required for automatic operation instruction generation.

The orientation information shown in FIG. 16 is an example. For example, when the operator carries out an operation of actuating the boom 31 or arm 32, in addition to the bucket 33, in the soil discharge period, an automatic operation instruction for additionally actuating the boom 31 or arm 32 is generated in the soil discharge period.

As described above, according to the operation instruction system 102 of the third embodiment, the orientation information is generated continuously, the orientation information associating a type and an operation amount of operation of the operation lever 51, the types and the operation amount being detected continuously, a slewing angle of the upper slewing body 22, the slewing angle being detected continuously, and an orientation of the attachment 30, the orientation being detected continuously, with each other. Based on this orientation information, an operation pattern of the operation lever 51 is extracted, and the first teaching point information 211, which is the teaching point information at the time of the operation pattern being switched, and second teaching point information 212, which is teaching point information at the time of the operation pattern being continued, are generated. Generation of the first teaching point information 211 and the second teaching point information 212 allows the instruction generating unit 112 to generate an automatic operation instruction that is more detailed in contents. Automatic operation, therefore, causes the stewing device 24 and the attachment 30 of the work machine 2 to make more complicated movements. In addition, when orientation information is generated by a skilled operator's operation, the skilled operator's operation can be reproduced by automatic operation.

The orientation information indicating a series of movements is classified into a plurality of pieces of orientation information, based on information on types and operation amounts of the operation lever 51. An automatic operation instruction is then generated for each of classified pieces of orientation information. By classifying the orientation information indicating a series of movements into the plurality of pieces of orientation information, a part of attachment 30 to be moved and a slewing angle of the upper slewing body 22 can be made clear for each of the divided pieces of orientation information. This makes it easy to generate an automatic operation instruction for each of the classified pieces of orientation information, thus reducing load required for automatic operation instruction generation.

The operation instruction system 102 according to the third embodiment may further include the surrounding condition acquiring device 4 as the operation instruction system 101 of the second embodiment does.

The embodiments of the present invention have been described above. However, the described embodiments are merely specific examples, and do not put any limit on the present invention. Their specific configurations and the like may be changed when necessary. It should be noted also that effects described in the embodiments of the present invention are a list of most preferable effects that the present invention offers, and that the effects of the present invention are not limited to these effects described in the embodiments of the present invention.

For example, the present invention is not limited to the configuration in which the controller 11 of the work machine 2 generates the orientation information. The controller 15 of the mobile terminal 3 may generate the orientation information or a device different from the work machine 2 and the mobile terminal 3 may generate the orientation information. Further, the present invention is not limited to the configuration in which the controller 11 of the work machine 2 generates an automatic operation instruction. The controller 15 of the mobile terminal 3 may generate an automatic operation instruction or a device different from the work machine 2 and the mobile terminal 3 may generate an automatic operation instruction.

Summary of Embodiment

Technical features of the embodiments can be summarized as follows.

An operation instruction system according to an aspect of the present invention includes: a work machine; a mobile terminal capable of communicating with the work machine; an information generating unit that generates orientation information on the work machine; and an instruction generating unit that generates an instruction for operating the work machine, in which the work machine includes: a lower travelling body; an upper slewing body attached rotatably to top of the lower travelling body; a slewing device capable of causing the upper slewing body to slew; an attachment attached rotatably to the upper slewing body; a slewing angle detection device that detects a slewing angle of the upper slewing body relative to the lower travelling body; an orientation detection device that detects an orientation of the attachment; and an operation control unit that operates the slewing device and the attachment, based on the instruction generated by the instruction generating unit, the information generating unit generates the orientation information, based on a slewing angle of the upper slewing body, the slewing angle being detected by the slewing angle detection device, and on an orientation of the attachment, the orientation being detected by the orientation detection device, the mobile terminal includes: a point generating unit that generates, based on the orientation information generated by the information generating unit, teaching point information associating a teaching position that teaches a position of the attachment in a series of movements to be performed by the work machine with the orientation information indicating a target orientation at the teaching position; and a point changing unit that changes the teaching point information generated by the point generating unit, the instruction generating unit generates an automatic operation instruction for automatically operating the slewing device and the attachment, based on the teaching point information generated the by the point generating unit, and when the teaching point information is changed by the point changing unit, generates the automatic operation instruction, based on the changed teaching point information, and the operation control unit automatically operates the slewing device and the attachment, based on the automatic operation instruction generated by the instruction generating unit.

According to this configuration, the slewing device and the attachment of the work machine are automatically operated, based on the automatic operation instruction. When teaching point information is changed by the mobile terminal, an automatic operation instruction is generated, based on the changed teaching point information, and the stewing device and the attachment of the work machine are automatically operated, based on the generated automatic operation instruction. Because the teaching point information is changed by the mobile terminal, the worker does not need to operate the work machine in order to generate the changed teaching point information. By bringing the mobile terminal to the work site, therefore, the worker is able to change the teaching point information on site while checking the work subject. Hence work efficiency can be improved.

In the above operation instruction system, the work machine further includes: an operation lever operated by an operator to operate the slewing device and the attachment; and an operation amount detection device that continuously detects a type and an operation amount of operation of the operation lever, the slewing angle detection device continuously detects the stewing angle of the upper stewing body, the stewing angle being changed continuously by an operation of the operation lever, the orientation detection device continuously detects the orientation of the attachment, the orientation being changed continuously by an operation of the operation lever, and the information generating unit continuously generates the orientation information that associates the type and the operation amount of operation of the operation lever, the type and the operation amount being detected continuously by the operation amount detection device, the slewing angle of the upper slewing body, the slewing angle being detected continuously by the slewing angle detection device, and the orientation of the attachment, the orientation being detected continuously by the orientation detection device, with each other, and the point generating unit may extract an operation pattern of the operation lever, based on the orientation information generated continuously by the information generating unit, and may generate first teaching point information that is teaching point information when the operation pattern is switched, and second teaching point information that is teaching point information when the operation pattern is continued.

According to this configuration, the orientation information is generated continuously, the orientation information associating the type and the operation amount of operation of the operation lever, the type and the operation amount being detected continuously, the slewing angle of the upper slewing body, the slewing angle being detected continuously, and the orientation of the attachment, the orientation being detected continuously, with each other. Based on this orientation information, the operation pattern of the operation lever is extracted, and the first teaching point information 211 that is teaching point information when the operation pattern is switched and the second teaching point information 212 that is teaching point information when the operation pattern is continued are generated. Generation of the first teaching point information 211 and the second teaching point information 212 allows the instruction generating unit to generate an automatic operation instruction that is more detailed in contents. Automatic operation, therefore, causes the slewing device and the attachment of the work machine to make more complicated movements. In addition, when orientation information is generated by a skilled operator's operation, the skilled operator's operation can be reproduced by automatic operation.

In the above operation instruction system, the point generating unit may classify the orientation information indicating the series of movements into a plurality of pieces of orientation information, based on information on a type and an operation amount of operation of the operation lever, the information being included in the orientation information, and the instruction generating unit may generate the automatic operation instruction for each of the plurality of pieces of orientation information classified by the point generating unit.

According to this configuration, the orientation information indicating the series of movements is classified into the plurality of pieces of orientation information, based on the information on the type and the operation amount of operation of the operation lever. An automatic operation instruction is then generated for each of classified pieces of orientation information. By classifying the orientation information indicating the series of movements into the plurality of pieces of orientation information, a part of attachment to be moved and a slewing angle of the upper slewing body can be made clear for each of the classified pieces of orientation information. This makes it easy to generate an automatic operation instruction for each of the classified pieces of orientation information, thus reducing load required for automatic operation instruction generation.

In the above operation instruction system, the mobile terminal further includes a change acceptance unit that accepts a change of the teaching point information generated by the point generating unit, the change being made by the worker, and the point changing unit may change the teaching point information, based on the contents of the change accepted by the change acceptance unit.

According to this configuration, the change of the generated teaching point information, the change being made by the worker, is accepted by the mobile terminal, and the teaching point information is changed, based on the accepted contents of the change. The worker is thus allowed to easily change the teaching point information, using the mobile terminal. The worker, therefore, is able to save trouble of operating the work machine for the purpose of changing the teaching point information.

The above operation instruction system further includes a surrounding condition acquiring device that acquires the surrounding conditions of the work site, and the point changing unit may change the teaching point information, based on the surrounding conditions acquired by the surrounding condition acquiring device.

According to this configuration, the teaching point information is automatically changed, based on the surrounding conditions of the work site. As a result, for example, when an obstacle that interferes with the attachment is detected, a movement of the work machine in automatic operation can be automatically corrected. Hence work efficiency can be improved.

The invention claimed is:

1. An operation instruction system comprising:
a work machine including a controller; and
a mobile terminal capable of communicating with the work machine,
wherein the controller includes an information generating unit that generates orientation information on the work machine, and an instruction generating unit that generates an instruction for operating the work machine,
wherein the work machine includes:
a lower travelling body;
an upper slewing body attached rotatably to top of the lower travelling body;
a slewing device capable of causing the upper slewing body to slew;
an attachment attached rotatably to the upper slewing body;
a slewing angle detection device that detects a slewing angle of the upper slewing body relative to the lower travelling body; and
an orientation detection device that detects an orientation of the attachment,
wherein the controller includes an operation control unit that operates the slewing device and the attachment, based on the instruction generated by the instruction generating unit,
the information generating unit generates the orientation information, based on a slewing angle of the upper slewing body, the slewing angle being detected by the slewing angle detection device, and on an orientation of the attachment, the orientation being detected by the orientation detection device,
the mobile terminal includes:
a point generating unit that generates, based on the orientation information generated by the information generating unit, teaching point information associating a teaching position that teaches the work machine a position of the attachment in a series of movements to be performed by the work machine with the orientation information indicating a target orientation at the teaching position; and
a point changing unit that changes the teaching point information generated by the point generating unit,
the instruction generating unit generates an automatic operation instruction for automatically operating the slewing device and the attachment, based on the teaching point information generated by the point generating unit,
when the teaching point information is changed by the point changing unit, the instruction generating unit generates the automatic operation instruction, based on the changed teaching point information, and
the operation control unit automatically operates the slewing device and the attachment, based on the automatic operation instruction generated by the instruction generating unit,
the work machine further includes:
an operation lever operated by an operator to operate the slewing device and the attachment; and
an operation amount detection device that continuously detects a type and an operation amount of operation of the operation lever,
the slewing angle detection device continuously detects the slewing angle of the upper slewing body, the slewing angle being changed continuously by an operation of the operation lever,
the orientation detection device continuously detects the orientation of the attachment, the orientation being changed continuously by an operation of the operation lever,
the information generating unit continuously generates the orientation information that associates the type and the operation amount of operation of the operation lever, the type and the operation amount being detected continuously by the operation amount detection device, the slewing angle of the upper slewing body, the slewing angle being detected continuously by the slewing angle detection device, and the orientation of the attachment, the orientation being detected continuously by the orientation detection device, with each other,
the point generating unit extracts a first operation pattern and a second operation pattern of the operation lever, based on the orientation information generated continuously by the information generating unit, and generates first teaching point information associating a first teaching position that teaches a position of the attachment with the orientation information indicating a target orientation at the first teaching position when the first operation pattern is switched to the second operation pattern, and second teaching point information associating a second teaching position that teaches a position of the attachment with the orientation information indicating a target orientation at the second teaching position when the first operation pattern and the second operation pattern are respectively continued, the first teaching position of the first teaching point information includes an excavation start position, an excavation end position, a contact avoiding position, and a soil discharge position, the second teaching position of the second teaching point information includes a position between the excavation start position and the excavation end position, a position between the excavation end position and the contact avoiding position, a position between the contact avoiding position and the soil discharge position, and a position between the soil discharge position and the excavation start position, and the point generating unit generates the first teaching point information when the attachment is at the excavation start position, the excavation end position, the contact avoiding position, and the soil discharge position, and generates the second teaching point information when the attachment is at the position between the excavation start position and the excavation end position, the position between the excavation end position and the contact avoiding position, the position between the contact avoiding position and the soil discharge position, and the position between the soil discharge position and the excavation start position.

2. The operation instruction system according to claim 1, wherein the point generating unit classifies the orientation information indicating the series of movements into a plurality of pieces of orientation information, based on information on a type and an operation amount of operation of the operation lever, the information being included in the orientation information, and the instruction generating unit generates the automatic operation instruction for each of the plurality of pieces of orientation information classified by the point generating unit.

3. The operation instruction system according to claim 1, wherein the mobile terminal further includes a change acceptance unit that accepts a change of the teaching point information generated by the point generating unit, the change being made by a worker, and the point changing unit changes the teaching point information, based on contents of the change accepted by the change acceptance unit.

4. The operation instruction system according to claim 1, further comprising a surrounding condition acquiring device that acquires surrounding conditions of a work site, wherein the point changing unit changes the teaching point information, based on the surrounding conditions acquired by the surrounding condition acquiring device.

* * * * *